(12) United States Patent
Li et al.

(10) Patent No.: US 10,216,449 B1
(45) Date of Patent: Feb. 26, 2019

(54) EXTENDED SNAPSHOT USING BACKUP AND MICROSERVICE

(71) Applicant: EMC IP Holding Company LLC, Hopkinton, MA (US)

(72) Inventors: Junxu Li, Pleasanton, CA (US); Scott Auchmoody, Irvine, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 86 days.

(21) Appl. No.: 15/390,138

(22) Filed: Dec. 23, 2016

(51) Int. Cl.
*G06F 3/06* (2006.01)
*G06F 11/14* (2006.01)

(52) U.S. Cl.
CPC ............ *G06F 3/0647* (2013.01); *G06F 3/067* (2013.01); *G06F 3/0619* (2013.01); *G06F 3/0641* (2013.01); *G06F 3/0643* (2013.01); *G06F 11/1451* (2013.01); *G06F 11/1453* (2013.01); *G06F 11/1464* (2013.01); *G06F 11/1469* (2013.01); *G06F 2201/805* (2013.01); *G06F 2201/82* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,598,224 | B1 * | 7/2003 | Maeda | H04L 63/083 707/999.1 |
| 6,779,003 | B1 * | 8/2004 | Midgley | G06F 11/2071 |
| 7,117,303 | B1 * | 10/2006 | Zayas | G06F 11/0727 711/112 |
| 7,590,810 | B2 * | 9/2009 | Matsui | G06F 11/2074 711/162 |
| 8,800,023 | B2 * | 8/2014 | Heithcock | G06F 11/1466 707/674 |
| 9,225,691 | B1 * | 12/2015 | Balasubramanian | ... G06F 21/00 |
| 9,336,092 | B1 * | 5/2016 | Li | G06F 11/1453 |
| 9,679,165 | B2 * | 6/2017 | Pittelko | G06F 21/78 |
| 9,904,602 | B1 * | 2/2018 | Auchmoody | G06F 17/30424 |
| 2003/0028592 | A1 * | 2/2003 | Ooho | G06F 11/1469 709/203 |
| 2003/0074378 | A1 * | 4/2003 | Midgley | G06F 11/1451 |
| 2003/0191911 | A1 * | 10/2003 | Kleinschnitz, Jr. | G06F 8/63 711/154 |

(Continued)

*Primary Examiner* — Midys Rojas
*Assistant Examiner* — Khoa D Doan
(74) *Attorney, Agent, or Firm* — Womble Bond Dickinson (US) LLP

(57) ABSTRACT

Embodiments are described for presenting a backed up data object to a client, in a native file format, in response to a request from the client to retrieve the requested data object. The request includes security attributes of the requested data object. If the security attributes in the request match the security attributes stored with the backed up data object, then the requested data objet is returned to the requesting client. When a backup is performed, metadata associated with each backed up data object is stored in the backup data set. When a request is received to restore a backed up data object, a metadata tree is constructed that represents the directory structure of the backed up data objects, and further includes security attributes for each data object and an offset into the backup data set where the requested data object can be found.

15 Claims, 10 Drawing Sheets

(56) References Cited

U.S. PATENT DOCUMENTS

| | | | |
|---|---|---|---|
| 2007/0208826 A1* | 9/2007 | Devolites | G06F 17/30197 709/219 |
| 2007/0250674 A1* | 10/2007 | Fineberg | G06F 11/1451 711/162 |
| 2007/0256117 A1* | 11/2007 | Shomo | G06F 21/6236 726/2 |
| 2008/0016127 A1* | 1/2008 | Field | G06F 11/1458 |
| 2008/0244732 A1* | 10/2008 | Coninck | G06F 11/1469 726/17 |
| 2009/0254561 A1* | 10/2009 | Shao | H04L 67/306 |
| 2010/0095354 A1* | 4/2010 | Uchida | G06F 21/6227 726/4 |
| 2010/0100721 A1* | 4/2010 | Su | G06F 11/1456 713/150 |
| 2010/0138932 A1* | 6/2010 | Chou | G06F 11/1446 726/28 |
| 2013/0173553 A1* | 7/2013 | Apte | G06F 7/00 707/640 |
| 2013/0227030 A1* | 8/2013 | Eidelson | H04L 67/1095 709/206 |
| 2014/0040211 A1* | 2/2014 | Avery | G06F 17/30073 707/662 |
| 2014/0046903 A1* | 2/2014 | Yin | H04W 8/30 707/644 |
| 2014/0075544 A1* | 3/2014 | Kim | G06F 21/44 726/16 |
| 2014/0136807 A1* | 5/2014 | Brown | G06F 3/06 711/164 |
| 2015/0363271 A1* | 12/2015 | Haustein | G06F 11/1464 707/682 |

* cited by examiner

US 10,216,449 B1

EXTENDED SNAPSHOT USING BACKUP AND MICROSERVICE

TECHNICAL FIELD

This disclosure relates to the field of restoring previously backed up data.

BACKGROUND

Some, or all, data of a client that is stored on a primary storage may be backed up to a secondary or backup storage. A client can be a standalone personal computing device, a server, or a virtual machine. Client data can include one or more files, an entire file system, an image backup of the client, or a system dump by inode of the file system. Before data is backed up, it may be compressed or deduplicated by a backup system. Thus, when the backed up data object is requested for restoration to the client, the data object may need to be decompressed or undeduplicated before it is usable by a client file system. In a virtual environment, networked environment, or multi-user computing environment, data on the primary storage may have security attributes that determine which user(s), group(s), or client(s) are authorized to access the data on the primary storage. In the prior art, a backup is typically performed under a system administrator's authority which has greater access privileges than most users, groups, or clients. Accordingly, the backed up data is not accessible by individual users, groups, or clients and often requires that the administrator perform the restore in response to a user request. Also in the prior art, data is written to a backup data set in a linear fashion such that, in order to access a particular data object in the backup data set, it is necessary to either record absolute offset of all data objects in the backup data set in advance, which would cause poor deduplication for additional backups, or sequentially walk data objects in the backup data set until a particular data object to be accessed for restoration is found, which is highly inefficient. For at least the foregoing reasons, in the prior art users cannot efficiently access, without losing deduplication, or view, or restore their own data objects from a backup of their own data.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
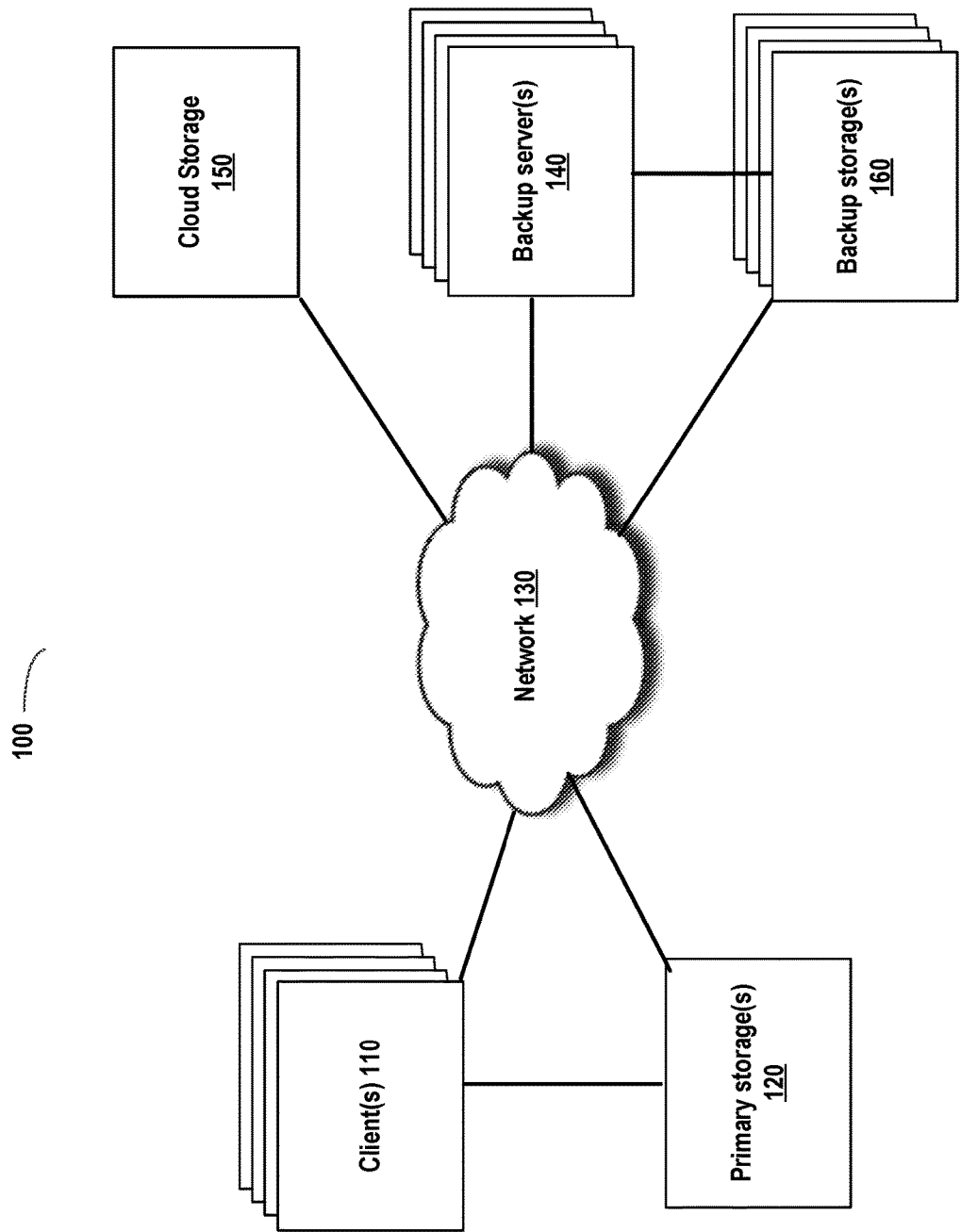
FIG. 1 illustrates, in block diagram form, an overview of an infrastructure that enables a user to access, view, or restore a data object to which the user has security access, from a backup of a plurality of data objects, in accordance with some embodiments.

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Embodiments are described for restoring a data object of backup data set to a requesting client. The client request includes security attributes of the requested data object. In response to determining that the security attributes in the request match one or more security attributes of the requested data object, the data object and metadata associated with the data object are returned to the requesting client device. In response to receiving the request, if a metadata tree does not yet exist for the backup data set containing the requested data object, then the metadata tree can be constructed from backup data and/or extended snapshot data. If the metadata tree is to be generated at the time of the backup, then the extended snapshot can be used, along with metadata of the backup. Otherwise the metadata tree can be generated from the backup data set and associated metadata of each data objet in the metadata set. In an embodiment, generation of the metadata tree can stop as soon as a node is added to the metadata tree that represents the requested data object. Once the offset of the requested data object within the backup data set is known, the metadata tree generation can stop. In an embodiment, the metadata tree can be incrementally generated for each subsequent request for a data object in the backup data set that has not already resulted in adding a node to the metadata tree for the requested data object. In an embodiment, if a backup is a full backup (vs. an incremental backup), the metadata tree can be generated at the time that the full backup is performed. In a embodiment, security attributes of the data object as it appears in the native file system on the client, can be converted to a universal access control list (UACL) such that a user, group, or device security privilege to access the data object can be verified even if the request to restore the data object comes from a different file system than the file system from which the data object was backed up. In an embodiment, the UACL is an access control list that is a unification of both NFTS and Unix/Linux access control lists. A microservice in the backup storage, backup server, or primary storage, can convert the UACL into the access control list type of the primary storage and/or file system access control type of the client. The microservice can also convert file system-specific access control formats into UACL for storage with a backup data object. A microservice in the backup storage, backup server, or primary storage can convert the universal file format version of the data object into the client file system version of the data object. In an embodiment, when a data object is backed up, it can be stored in a universal, file system-independent, format such that the data object can be restored to a different file system than the file system from which it was backed up. In an embodiment, a requested data object was compressed or deduplicated when backed up, then a microservice on a backup storage or backup server can decompress and/or undeduplicate the requested data object before returning the requested data object to the requesting client device.

Any of the above methods can be embodied on a non-transitory computer-readable medium programmed with executable instructions that, when executed, perform the method. A system can be programmed with executable instructions that, when executed by a processing system that includes at least one hardware processor, can perform any of the above methods.

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code. At least certain embodiments include an environment with a calling software component interacting with a called software component through an API. A method for operating through an API in this environment includes transferring one or more function calls, messages, other types of invocations or parameters via the API.

FIG. 1 illustrates, in block diagram form, an overview of an infrastructure 100 that enables a user to access, view, or restore a data object to which the user has security access, from a backup of plurality of data objects, in accordance with some embodiments.

An infrastructure 100 that enables a user to access, view, or restore a data object to which the user has security access, from a backup of a plurality of data objects, can include one or more clients 110, one or more primary storages 120, a restore server 140, cloud storage 150, and one or more backup storages 160 interconnected via network 130.

Clients 110 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Clients 110 may store data to a primary storage system 120, which may periodically back up the content stored therein to a backup storage system (e.g., a disaster recovery site or system), such as backup storage 160 or cloud storage 150 (collectively or individually, backup storage 160). Network 130 may be any type of network such as a local area network (LAN), a wide area network (WAN) such as the Internet, a fiber network, a storage network, or a combination thereof, wired or wireless.

Client 110 can backup or restore one or more data objects, files, images of a file system, or virtual disks of a virtual machine, LUNs, or other data units stored on the primary storage 120 to or from the backup storage 160. Restore server 140 can optionally facilitate a backup or restore of a data object of a backup from backup storage 160 to primary storage 120. Primary storage 120, backup storage 160, and cloud storage 150 can each comprise a plurality of storage appliances having a large number of disks, such as a storage area network (SAN) storage. In an embodiment, a virtual disk can be a raw virtual disk mapped to a one or more portions of storage. A portion of primary storage 120 can comprise one or more logical unit numbers (LUNs) of a single physical disk or one or more physical disks. In an embodiment, a raw disk can be configured to use virtual mapping to one or portions of storage, such that the portions of storage can be snapshot before a backup. In an embodiment, a raw virtual disk can be physically mapped to one or more portions of storage.

A backup of a client 110 data object stored on primary storage 120 can be initiated by a user of the client 110, by a restore server 140, or backup storage 160. A data object being backed up may be compressed or deduplicated by a microservice on backup server 140, cloud storage 150, or backup storage 160 before the data object is stored. A data object being backed up can comprise data to be backed up and metadata describing the data object. Metadata of the data object can include security attributes required to access, save, read, write, or execute the data object, a create date, modification date, size, filename of the data object, and other data object attributes. Each backup of a plurality of data objects may include the plurality of data objects, metadata for each data object, and metadata describing the backup. Metadata describing the backup can including a backup policy, a list of one or more clients 110 whose data is being backed up, a data and time of the backup, the total size and number of data objects in the backup, a storage media type for the backup, and other attributes of the backup. In an embodiment, scheduled backups can be initiated by backup server 140. Backup server 140 can initiate a backup or restore of data objects stored on primary storage 120 in accordance with one or more backup policies associated with client 110.

Any of backup server 140, cloud storage 150, or backup storage 160 can implement a lightweight service, such as a microservice, that facilitates restoration of a data object in a backup data set having a plurality of data objects, from backup storage 160 or cloud storage 150 to primary storage 120. Client 110 can also implement a lightweight service, such as a microservice, that facilitates restoration of a data object in a backup data set having a plurality of data objects, from backup storage 160 or cloud storage 150, to primary storage 120. Client 110 microservice 114 or backup microservice 124, 144, or 164 can be implemented using an application framework, an application programming interface (API), one or more operating system services, or applications. An exemplary API for implementing the microservice is described below with reference to FIG. 9. Backup server 140, cloud storage 150, and backup storage 160 can be implemented using hardware as described below with reference to FIG. 10.

Figure 2:
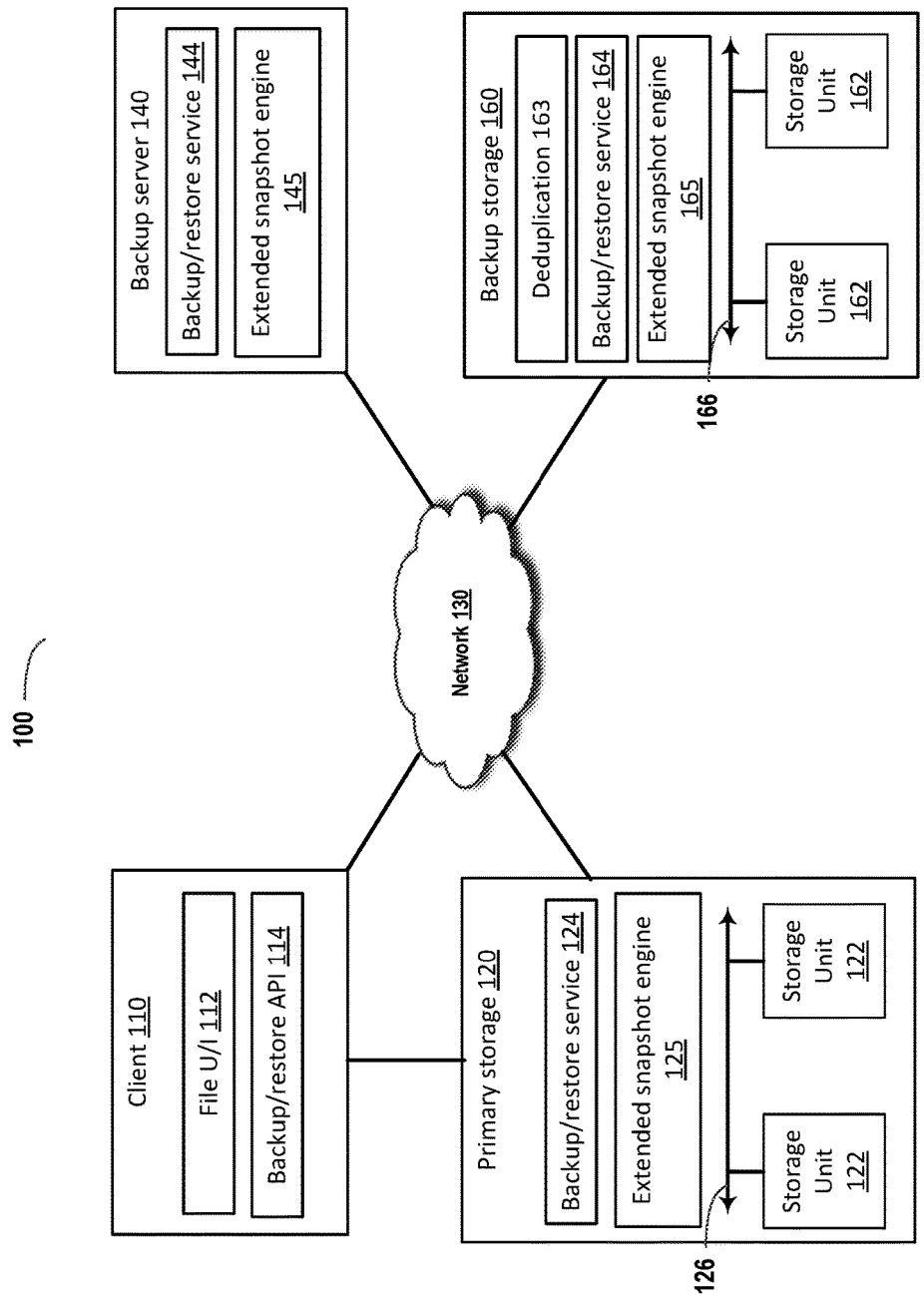
FIG. 2 illustrates, in block diagram form, a detailed view of an infrastructure that enables a user to access, view, or restore a data object to which the user has security access, from a backup of a plurality of data objects, in accordance with some embodiments.

FIG. 2 illustrates, in block diagram form, a detailed view of an infrastructure 100 that enables a user to access, view, or restore a data object to which the user has security access, from a backup of plurality of data objects, in accordance with some embodiments.

As described above, the infrastructure 100 can include clients 110, primary storages 120, network 130, a backup server 140 and backup storage 160 (and/or cloud storage 150).

Client 110 can include a file system, such as NFS (Unix) or NTFS, FAT, or FAT32 (Windows), CD-ROM file system (CDFS), universal disk format (UDF), resilient file system (ReFS), extended FAT (exFAT), common Internet file system (CIFS) protocol, and direct access file system protocol, etc. Block-based access protocols may include the small computer system interface (SCSI) protocols, Internet SCSI or iSCSI, and Fibre channel (FC) protocol, etc. Files stored in the client 110 file system and primary storage 120 can have security attributes that determine which user(s), group(s) of users, or device(s) can access a particular data object in the client file system. Accessing a data object can include reading, writing, executing, renaming, copying, deleting, or other access to the file. A file user interface 112 on client 110 can read, write, execute, rename, add, delete, modify, and display files on client 110 in the client file system. Data objects can have metadata including the foregoing access security attributes, a file name, directory, parent directory, date of creation, date of last modification, file size, owner, and other file metadata. Client 110 restore API 114 can implement a microservice that can extract metadata, including file security attributes, and convert the metadata into a universal access control list (UACL) format for use back backup server 140 and/or backup storage 160. Data objects in client 110 file system can include a file, directory, inode of a file system, image backup of the client, including virtual machine images, system dump, or other data object. Client restore API 114 can convert client 110 data objects into, and out of, a universal data object format for use by backup server 140 and/or backup storage 160. Client restore API 114 can be implemented using an API, framework, one or more operating system services, and inter-processing communication, messages, and other operating system functions to implement the functionality of restore API 114.

Primary storage 120 can store data objects of one or more clients 110. Primary storage 120 can include a backup/restore service 124 and one or more storage units 122. Primary storage 120 can be a storage appliance comprising processors, memory, and physical storage units 122 interconnected by backplane 126 or a high-speed network 126. Primary storage 120 can implement one or more file systems, such as NFS, FAT, FAT32, NTFS, and the like. Backup/restore service 124 can perform one or more of the features of client backup/restore API 114. Backup/restore service 124 can perform both backup and restore functionality and can expose some or all of its functionality to backup server 140 and/or backup storage 160 via an API or framework. Backup server 140 and/or backup storage 160 can call primary storage 120, invoking features within backup/restore service 124 to perform backup functionality, such as taking a snapshot of the data objects to be backed up and facilitating backup of the snapshot to backup storage 160. A snapshot of data to be backed up can include a list of data objects to be backed up, the time at which the snapshot was taken, and can include security attributes of the data objects to be backed up. Data objects can be files, directories, logical unit numbers (LUNs), disk partitions, virtual machine images, file system images, or other data objects.

Backup/restore service 124 can receive a list of data objects to be backed up, from backup/restore service 144 or backup/restore service 164. Extended snapshot engine 125 can obtain metadata for each data object to be backed up from data objects on primary storage 120. Metadata can include security attributes for each data object to be backed up. Extended snapshot engine 125 can convert the metadata of the data objects into a universal format that is independent of the file system type being backed up from the primary storage. Extended snapshot engine 125 can convert security attribute metadata for each data object into a universal access control list format (UACL). Primary storage 120, using backup/restore service 124 and extended snapshot engine 125, can interface with backup server 140 and/or backup storage 160 to backup each data object to backup storage 160. In an embodiment, extended snapshot engine 125 can generate a metadata tree that facilitates efficient and fast access to a data object in a backup data set. In an embodiment, the metadata tree can be generated in response to receiving a request from a client 110 to restore a data object from a backup data set. In an embodiment, the metadata tree can be generated in response to a backup being a full backup (vs. an incremental backup) of one or more data objects. The metadata tree is described in detail, below, with reference to FIG. 3 and FIG. 4. In an embodiment, the metadata tree can be generated by one of extended snapshot engine 145 or extended snapshot engine 165 to reduce processing load on the primary storage 120.

Backup server 140 can include a backup/restore service 144 having some or all of the functionality of primary storage 120 restore service 124 and client 110 backup/restore API 114. Client 110 and primary storage 120 performance can be increased by offloading some or all of the functionality of backup/restore API 114 and/or backup/restore service 124 to backup server 140 backup/restore service 144. Backup server 140 can further include extended snapshot engine 145. Extended snapshot engine 145 can access one or more storage policies for a backup to be performed. A backup policy can determine the time interval at which a backup is performed, whether the backup is incremental or a full backup, the type of storage to which the backed up data objects are to be stored, whether the data is to be compressed or deduplicated, and how long the backup is to be stored. Extended snapshot engine can 145 can pass this information to primary storage 120 backup/restore service 124 and request that primary storage 120 take a snapshot of data objects that match the backup criteria. Backup/restore service 144 can receive a list of data objects to be backed up, from backup/restore service 124, including metadata of the each data object. Metadata can include security attributes for each data object to be backed up. Extended snapshot engine 145 can convert the metadata of the data objects into a universal format that is independent of the file system type being backed up from the primary storage. Extended snapshot engine 145 can convert security attribute metadata for each data object into a universal access control list format (UACL). Backup server 140, using backup/restore service 144 and extended snapshot engine 145, can interface with backup storage 160 to backup each data object to backup storage 160. As backup server 140 receives each data object of the snapshot from primary storage 120, backup server 140 can use backup/restore service 144 and/or extended snapshot engine 145 to interface with backup storage 160 to facilitate backup of the data objects. In an embodiment, extended snapshot engine 145 can generate a metadata tree that facilitates efficient and fast access to a data object in a backup data set. In an embodiment, the metadata tree can be generated in response to receiving a request from a client 110 to restore a data object from a backup data set. In an embodiment, the metadata tree can be generated in response to a backup being a full backup (not an incremental backup) of one or more data objects. The metadata tree is described in detail, below, with reference to FIG. 3 and FIG. 4.

Backup storage 160 can include a deduplication and compression engine 163, restore service 164, extended snapshot engine 165, and one or more physical storage units 162 interconnected via a backplane or network 166. Backup storage 160 can further include one or more hardware processors, memory, backplane or high-speed network 166, and other hardware and software to implement the described functionality. Restore service 164 can implement some, or all, of the functionality of backup server 140 restore service 144. Extended snapshot engine 165 can implement some, or all, of the functionality of backup server 140 extended snapshot engine 145, including generation of the metadata tree for a backup data set. In an embodiment, backup server 140 is not needed to perform a backup or restore of a data object from/to primary storage 120, with all backup and restore functionality being performed by client 110, primary storage 120, and/or backup storage 160. Deduplication and compression module 163 can deduplicate and/or compress each data object received from primary storage 120. In an embodiment, whether a data object is compressed or deduplicated before backup, is determined by a backup policy. Deduplication and compression module 163, backup/restore service 164, and extended snapshot engine 165 can be implemented using an API, software framework, one or more operation system calls, or one or more applications. Functionality of the backup/restore service 164 can be split or shared as between client backup/restore API 114, primary storage 120 backup/restore service 124, backup server 140 backup/restore service 144, and/or backup storage 160 backup/restore service 164 to balance performance between the client 110, primary storage 120, backup server 140, and/or backup storage 160. Functionality of the extended snapshot engine can be split or shared between primary storage 120 extended snapshot engine 125, backup server 140 extended snapshot engine 145, or backup storage 160 extended snapshot engine 165 to balance performance between the primary storage 120, backup server 140, and backup storage 160.

Primary storage 120 and backup storage 160 (individually and collectively, "storages 120/160") can include any type of server or cluster of servers. For example, storages 120/160 may be a storage server used for any of various different purposes, such as to provide multiple users with access to shared data and/or to back up mission critical data. Storages 120/160 may be, for example, a file server (e.g., an appliance used to provide NAS capability), a block-based storage server (e.g., used to provide SAN capability), a unified storage device (e.g., one which combines NAS and SAN capabilities), a near-line storage device, a direct attached storage (DAS) device, or essentially any other type of data storage device. Storages 120/160 may have a distributed architecture, or all of its components may be integrated into a single unit. Storages 120/160 may be implemented as part of a source storage available from EMC® Corporation of Hopkinton, Mass., such as the EMC® VMAX family of storage appliances.

Storage unit(s) 122 and 162 may be implemented locally (e.g., single node operating environment) or remotely (e.g., multi-node operating environment) via a bus and/or a network. In one embodiment, one of the storage units 122 can operate as an active storage to receive and store external or fresh user data, while the other storage unit 122 operates as a target storage unit to periodically archive data from the active storage unit according to an archiving policy or scheme. Storage units 122 and 162 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 122 and 162 may also be combinations of such devices. In the case of disk storage media, the storage units 122 and 162 may be organized into one or more volumes of Redundant Array of Inexpensive Disks (RAID). Note that a source storage of a client may also be called the primary storage of the client to distinguish the storage from backup source storages.

Backup storage 160 can be coupled to backup server 140 either as direct attached storage (DAS) or as network attached storage (NAS) via network 130. Backup storage 160 may include any type of server or cluster of servers. For example, backup storage 160 may be a storage server used for any of various different purposes, such as to provide multiple users with access to shared data and/or to back up mission critical data. Backup storage 160 may be, for example, a file server (e.g., an appliance used to provide NAS capability), a block-based storage server (e.g., used to provide SAN capability), a unified storage device (e.g., one which combines NAS and SAN capabilities), a near-line storage device, a direct attached storage (DAS) device, a tape backup device, or essentially any other type of data storage device. Backup storage may have a distributed architecture, or all of its components may be integrated into a single unit. Backup storage 160 may be implemented as part of an archive and/or backup storage system such as a de-duplication storage system available from EMC® Corporation of Hopkinton, Mass.

Deduplication module 163 of backup storage 160 can be configured to segment the data file into multiple segments according to a variety of segmentation policies or rules. Deduplication module 163 only stores a segment in a storage unit 162 if the segment has not been previously stored in the storage unit. In the event that a segment has been previously stored, metadata stores information enabling the reconstruction of a file using the previously stored segment. As a result, segments of data files are stored in a deduplicated manner, either within each of storage units 162 or across at least some of storage units 162. Data stored in the storage units 162 may be stored in a compressed form (e.g., lossless compression: Huffman coding, Lempel-Ziv Welch coding; delta encoding: a reference to a segment plus a difference; subsegmenting: a list of subsegments or references to subsegments, etc.). In one embodiment, different storage units may use different compression methods (e.g., main or active storage unit from other storage units, one storage unit from another storage unit, etc.).

Backup server 140 operating as a storage system may include or represent any type of servers or a cluster of one or more servers (e.g., cloud servers). For example, backup server 140 may be a storage server used for various different purposes, such as to provide multiple users or client systems with access to shared data and/or to back up (or restore) data (e.g., mission critical data). Storage system 300 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

Figure 3:
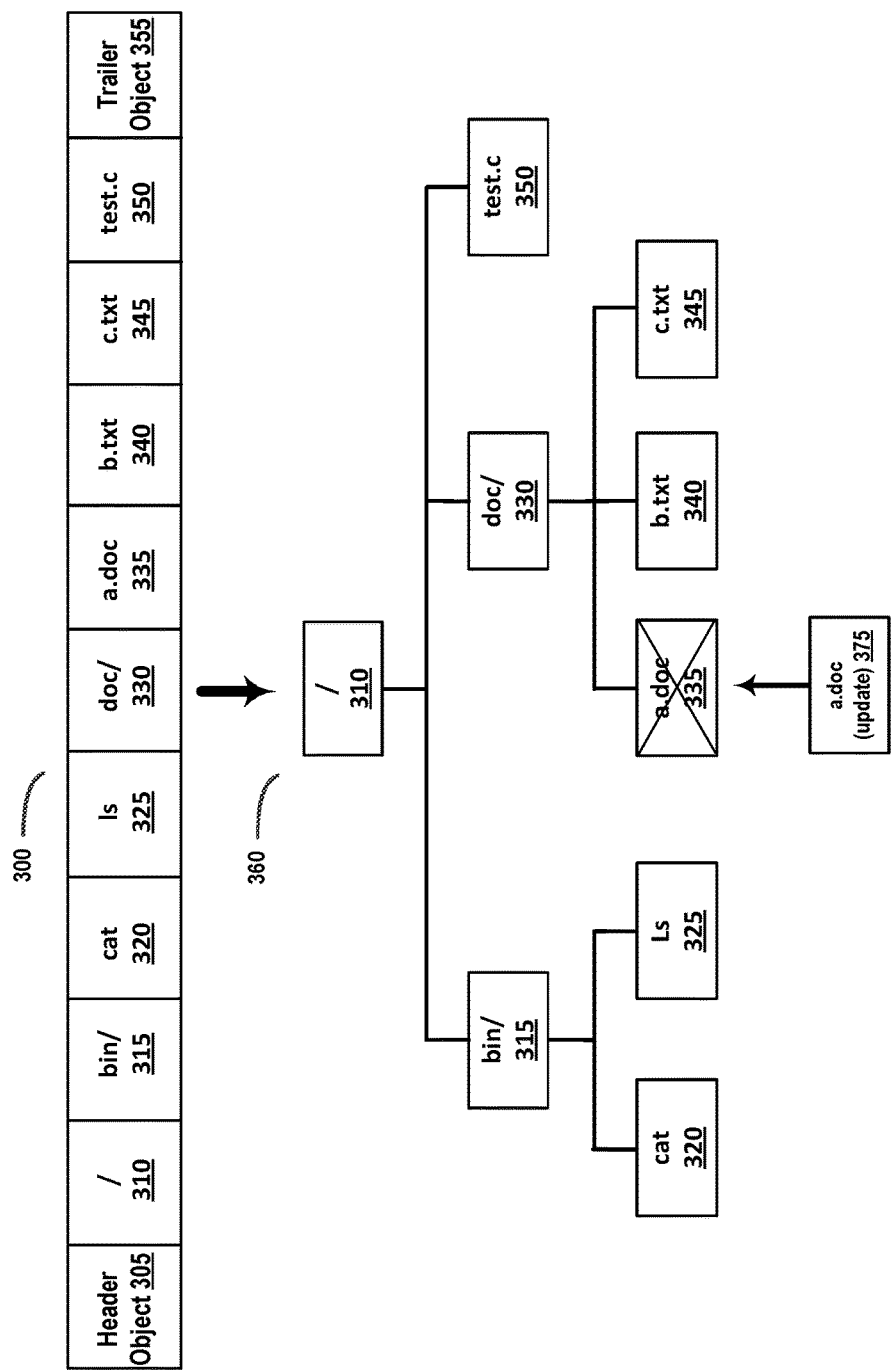
FIG. 3 illustrates a metadata tree generated from an extended snapshot of backup data, according to some embodiments.

FIG. 3 illustrates a metadata tree 360 generated from an extended snapshot 300 of backup data, according to some embodiments. The extended snapshot 300 can be generated by traversing the directory tree structure of the data objects to be backed up, as they appear on the primary storage 120 when the snapshot is taken, in e.g. a depth first manner. Metadata can be added to the extended snapshot 300 during backup as the data objects are being written. For example, a data object written may have been deduplicated or compressed before storage on backup storage 160 in the backup data set. The actual size of the data object, including any metadata stored with the data object, can be stored in the extended snapshot. Metadata stored with the data object can include security attributes associated with the data object.

A extended snapshot 300 can include a header object 305, a plurality of data objects, e.g. 310-350, and a trailer object 355. A header object 305 can include metadata about the backup, including a name, date of backup, user performing the backup, device being backed up, description of the backup data set, backup policy associated with the backup, and other information about the backup that is known before the backup is completed. A trailer object 355 contains metadata about the backup that includes information about the backup that is known after the backup has completed. The trailer object 355 can contain metadata describing the number of files in the backup data set, a total size of the backup data set, a time at which the backup completed, an elapsed time that it took to generate the backup data set, an amount of compression of the backup data set attributable to compression and/or deduplication, and the like.

In the example extended snapshot 300, data objects to be included in the backup include a root directory/310 having subdirectories bin/315 and doc/330. Subdirectory bin/315 has files cat 320 and ls 325. Subdirectory doc/330 has files a.doc 335, b.txt 340, and c.txt 345. Root directory/310 has file test.c 350. Primary storage 120 stores these directories and files as a directory tree, e.g. 360. When performing a backup, the extended snapshot can be generated by traversing the directory tree 360 on primary storage 120 in a depth first manner. The snapshot 300 represents the order in which the data objects will occur in the backup data set. As data objects are backed up, metadata about each data object is stored with the data object in the backup data set. Metadata about a data about can include a size of the data object, including the metadata for the data object, a name of the data object, a create date of the data object, a modification date of the data object, security attributes of the data object, whether the data object was compressed during backup, the compression algorithm used, whether the data object was deduplicated during backup, a pointer to the deduplicated data associated with the data block, and other metadata about the data object.

Each data object in a backup data set can have an exact seek address at which the data object is located within the backup data set. The seek address of the data object within the backup data set can be added as metadata to the backup data object before the backup data object is written to backup storage 160.

Metadata tree 360 is a data structure that is conceptually substantially the same as the directory structure of the data objects as they are stored on primary storage 120, but with additional metadata. The additional metadata can include the size of the data object as stored on backup storage 160, including all metadata stored with the object, and as reduced by compression and/or deduplication of the data object. The additional metadata of a node of the metadata tree can further include an offset value, stored with each node of the metadata tree, that indicates an offset within the backup where the backup data object can be found. In an embodiment, the offset value can be dynamically calculated based on individual data object sizes within the metadata tree, to maximize deduplication benefit.

After the metadata tree 360 is generated, it may be determined that a subsequent backup changed a particular file, e.g. a.doc 375 (update) with respect to a.doc 335 of the previous backup for which a metadata tree 360 was constructed. A node for the updated a.doc 375 can be added to the metadata tree 360. Metadata stored within node a.doc 375 can include a reference to the subsequent backup data set and offset into that data set where the updated a.doc 375 is found. Metadata tree 360 node and offset metadata in each node, other than a.doc 375, need not be changed.

Figure 4:
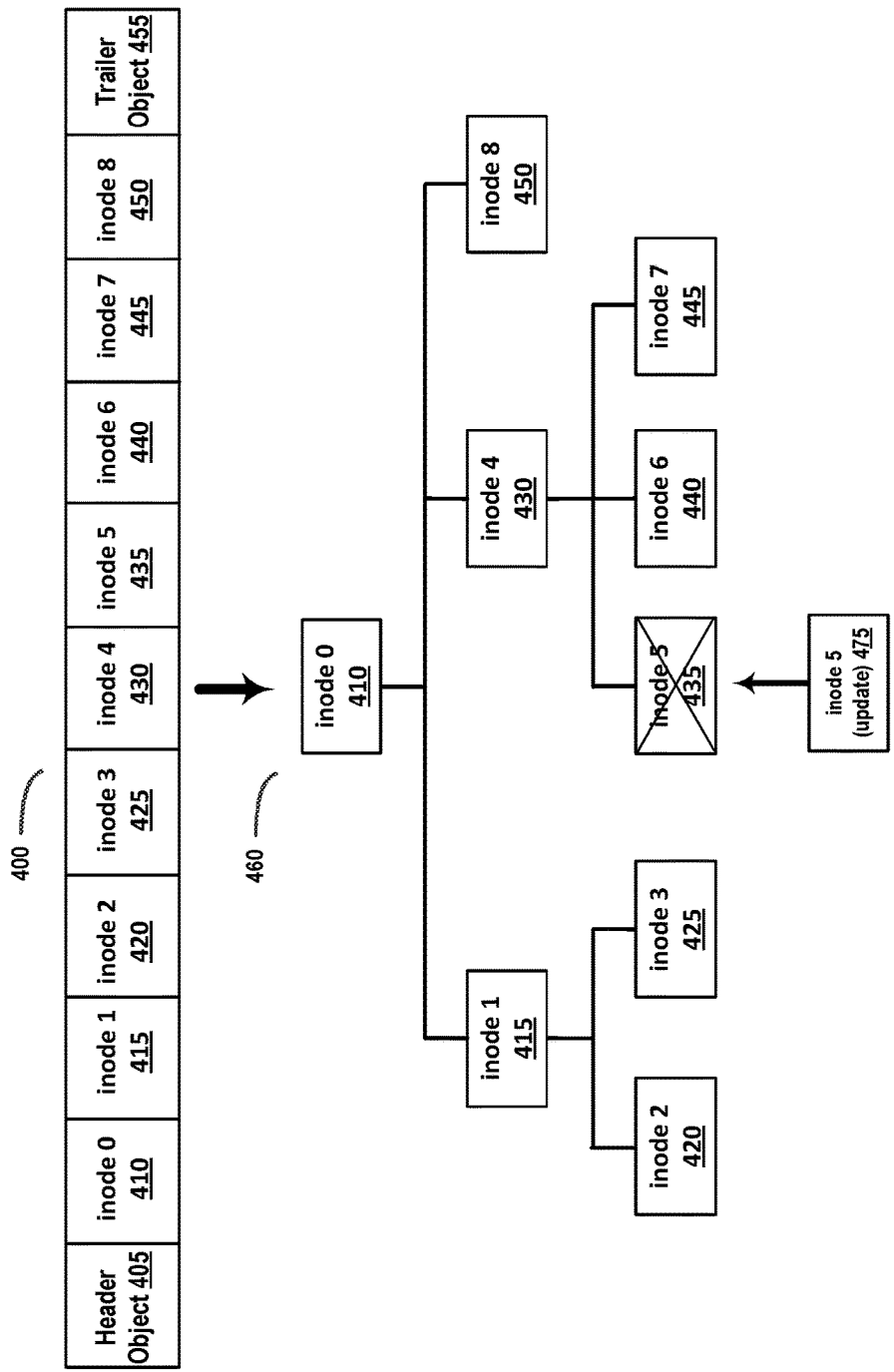
FIG. 4 illustrates a metadata tree generated from an extended snapshot of backup data, according to some embodiments.

FIG. 4 illustrates an extended snapshot 400 of backup data, according to some embodiments. The extended snapshot 400 can be generated by traversing the inode structure of the data objects to be backed up, as they appear on the primary storage 120 when the snapshot is taken, in e.g. a depth first manner such as according to a directory structure. Metadata can be added to the snapshot 400 during backup as the data objects are being written. For example, a data object written may have been deduplicated or compressed before storage on backup storage 160 in the backup data set. The actual size of the data object, including any metadata stored with the data object, can be stored in the extended snapshot. Metadata stored with the data object can include security attributes associated with the data object.

A extended snapshot 400 can include a header object 405, a plurality of data objects, e.g. 410-450, and a trailer object 455. A header object 405 can include metadata about the backup, including a name, date of backup, user performing the backup, device being backed up, description of the backup data set, backup policy associated with the backup, and other information about the backup that is known before the backup is completed. A trailer object 455 contains metadata about the backup that includes information about the back that is known after then backup has completed. The trailer object 455 can contain metadata describing the number of files in the backup data set, a total size of the backup data set, a time at which the backup set completed, an elapsed time that it took to generate the backup, an amount of compression of the backup data set attributable to compression and/or deduplication, and the like.

In the example snapshot 400, data objects to be included in the backup include a root directory inodes 0 (410) through 8 (450). The inodes can represent a directory structure, such as that shown in FIG. 4. Primary storage 120 stores the inodes as a directory tree, e.g. 460. When performing a backup, the snapshot can be generated by traversing the directory tree 460 on primary storage 120 in a depth first manner. The snapshot 400 represents the order in which the data objects will occur in the backup data set. As inode data objects are backed up, metadata about each inode data object is stored with inode data object in the backup data set. Metadata about a data about can include a size of the inode data object, including metadata, in the backup, a name, e.g. directory or filename, associated with the inode data object, a create date of the inode data object, a modification date of the inode data object, security attributes of the inode data object, whether the inode data object was compressed during backup, the compression algorithm used, whether the inode data object was deduplicated during backup, a pointer to the deduplicated data associated with the deduplicated inode object, and other metadata about the inode data object.

A backup of inode data objects may, or may not, be on a storage medium that is sequential, such as magnetic tape. Regardless of storage medium, each data object in a backup data set can have an exact seek address at which the data object is located within the backup data set. The seek address of the data object within the backup data set can be added as metadata to the backup data object before the backup data object is written to backup storage 160.

Metadata tree 460 is a data structure that is conceptually substantially the same as the inode structure of the inode data objects as they are stored on primary storage 160, but with additional metadata. The additional metadata can include the size of the inode data object as stored on backup storage 160, including all metadata stored with the inode data object, and as reduced by compression and/or deduplication of the inode data object. The additional metadata of a node of the metadata tree can further include an offset value, stored with each node of the metadata tree, that indicates an offset within the backup where the inode data object can be found.

After the metadata tree 460 is generated, it may be determined that a subsequent backup changed a particular inode, e.g. inode 5 475 (update) with respect to inode 5 435 in the previous backup for which a metadata tree 460 was constructed. The updated inode 5 475 can be added to the metadata tree 460. Metadata stored with node inode 5 475 can include a reference to the subsequent backup data set and offset into that data set where the updated inode 5 475 is found. After modification of a data object, many data objects can shift within the sequential backup layout, but unmodified data objects will remain with the same sizes, which can be used to dynamically calculate data object offsets.

Figure 5:
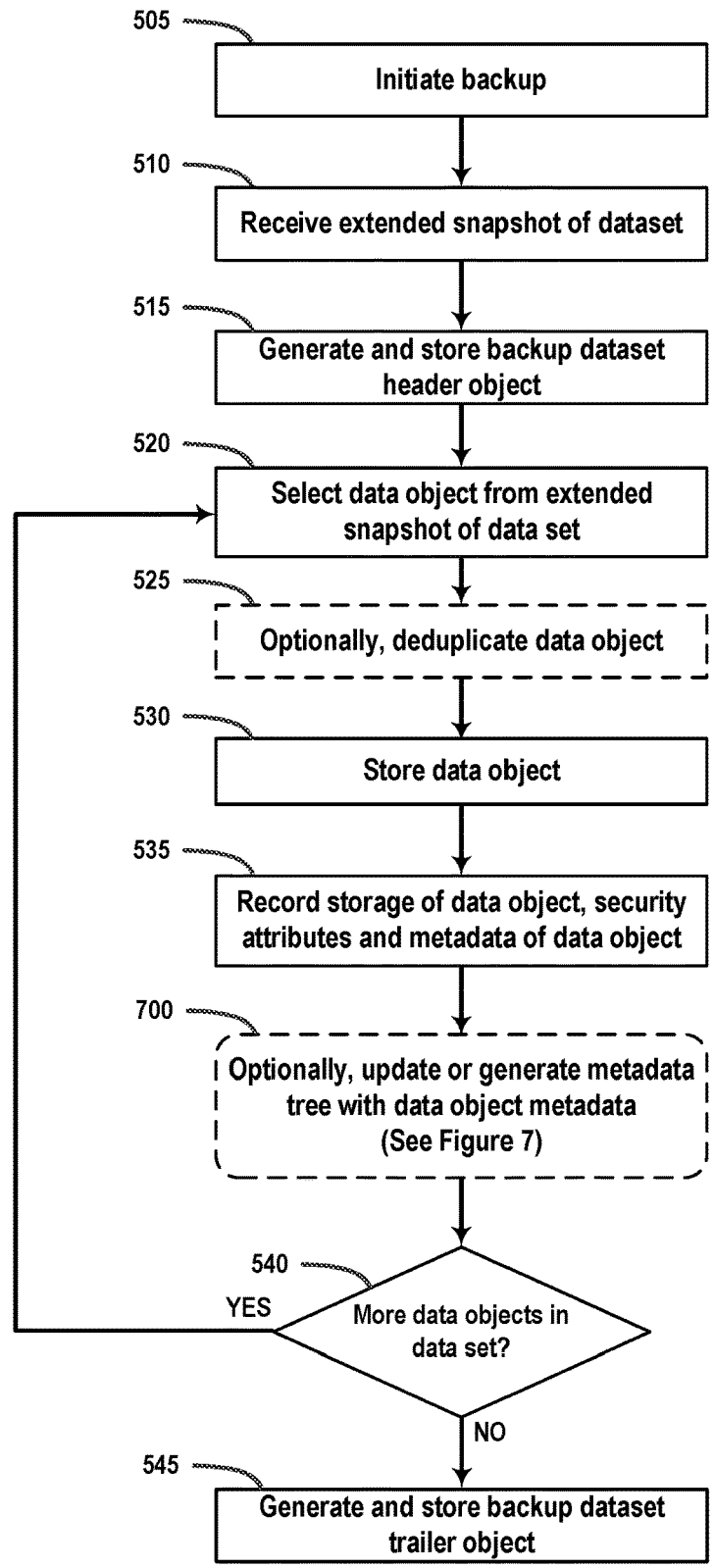
FIG. 5 illustrates a flow chart of a method that generates a backup of a plurality of objects in an infrastructure that enables a user to access, view, or restore a data object to which the user has security access, according to some embodiments.

FIG. 5 illustrates a flow chart of a method 500 that generates a backup of a plurality of objects in an infrastructure 100 that enables a user to access, view, or restore a data object to which the user has security access, according to some embodiments.

In operation 505, a backup can be initiated. The backup can be initiated by a user action on client 110, by backup server 140 in response to an administrator initiating the backup, or as a scheduled backup in accordance with a policy. In an embodiment, the backup can be initiated by a microservice, e.g. backup/restore service 164 on backup storage 160.

In operation 510, backup server 140 backup/restore service 144 or backup storage 160 backup/restore service 164 (individually and collectively, "backup/restore service") can receive an extended snapshot from primary storage 120 extended snapshot engine 125, backup server 140 extended snapshot engine 145, or backup storage 160 extended snapshot engine 165 (individually and collectively, "snapshot engine"). The extended snapshot includes an ordered list of data objects to be backed up, including metadata about each data object to be backed up, the metadata including security attributes that describe which users, groups, and devices can access each data object in the backup data set.

In operation 515, backup/restore service can generate and store the backup data set header object, e.g. 305 or 405.

In operation 520, backup/restore service can select a first data object from the extended snapshot of the data set for backing up.

In operation 525, backup storage 160 deduplication and compression module 163 can optionally deduplicate and/or compress the selected data block.

In operation 530, backup/restore service can store the selected data object, optionally compressed or deduplicated, and with metadata, on backup storage 160.

In operation 535, backup/restore service can generate a record of storage of the selected data object with metadata that describes the security attributes and other metadata about the backed up selected data object, and store the record with the backed up selected data object in the backed up data set.

In operation 700, a node of a metadata tree can optionally be generated and inserted into the metadata tree that represents the backed up selected data object. In an embodiment in which the metadata tree has been previously generated, such as for a prior full backup or a prior client request for restoration of a data object from the backup data set, and a subsequent incremental backup affects a node of the existing metadata tree, the affected node (e.g. 335 or 435) can be updated. In an embodiment, a pointer can be added to the affected metadata tree node, pointing to the incremental backup and offset within the incremental backup, where the updated backup data object information can be found. Operation 700 is described in detail, below, with reference to FIG. 7.

In operation 540, it can be determined whether there are any more data objects to backup in the data set. If there are more data objects to backup up, then method 500 continues at operation 520. Otherwise, method 500 continues at operation 545.

In operation 545, backup/restore service can generate and store the backup data set trailer object (e.g. FIG. 3, 355 or FIG. 4, 455).

Figure 6:
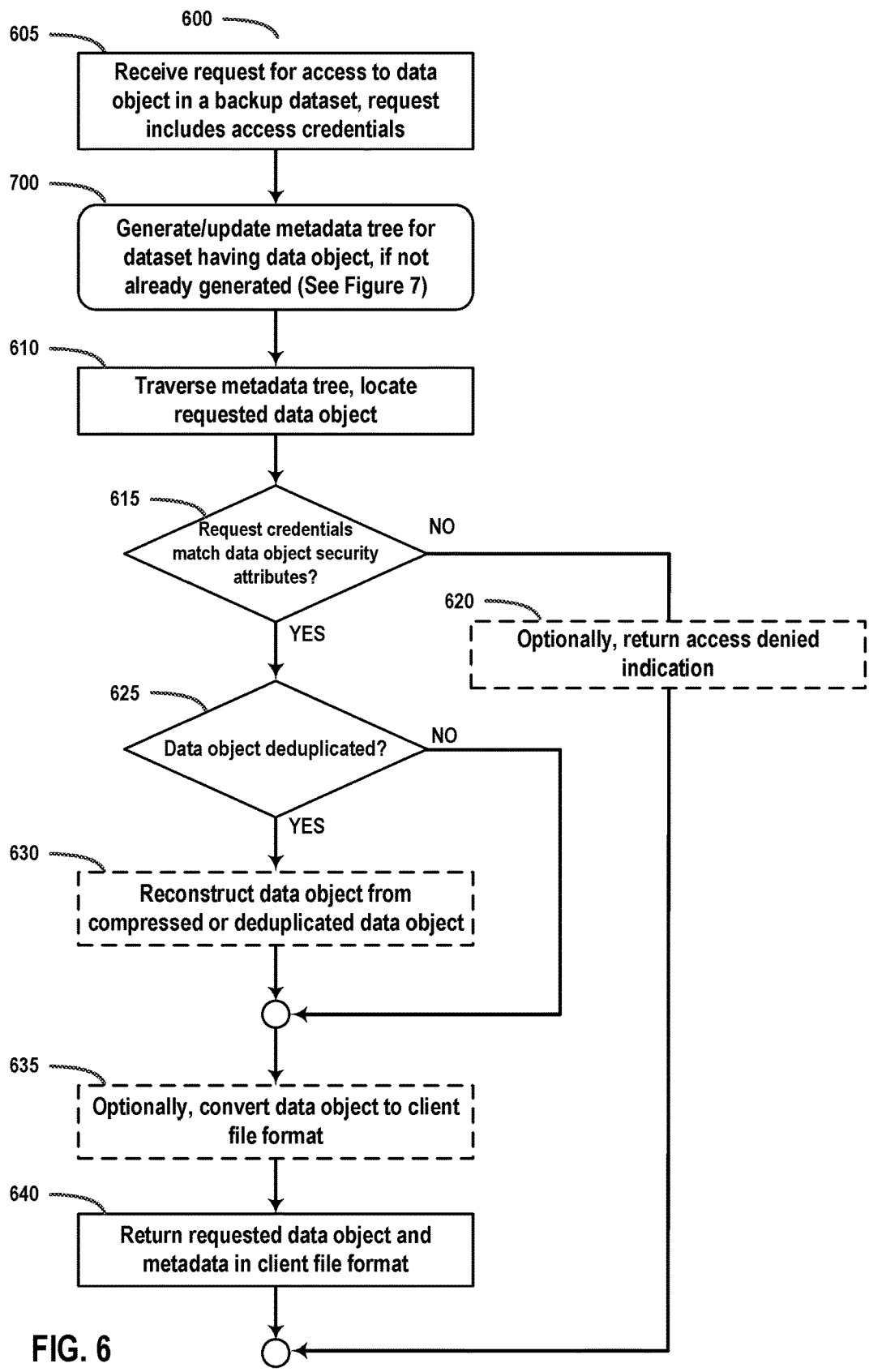
FIG. 6 illustrates a method of processing a request from a client for a data object from a backup data set of a plurality of data objects, according to some embodiments.

FIG. 6 illustrates a flow chart of a method 600 of processing a request from a client 110 for restoration of a data object from a backup data set of a plurality of data objects, according to some embodiments.

In operation 605, primary storage 120 backup/restore service 124, backup server 140 backup/restore service 144, or backup storage 160 backup/restore service 164 (individually and collectively "backup/restore service") can receive a request from a client 110 to restore a data object in a backup data set. The request can include security attributes of the requested data object. In an embodiment, the request can have already been converted into universal access control list (UACL) format. In an embodiment, backup/restore service can convert the security attributes received in the request to UACL format.

In operation 700, if the metadata tree for the backup data set has not yet been generated, such as by a previous request for restoration of a data object from the backup data set, then in operation 700 the metadata tree for the backup data set can be generated as described below with reference to FIG. 7.

In operation 610, the metadata tree can be traversed, searching for the requested data object in the metadata tree, until the requested data object is found.

In operation 615, it can be determined whether the security credentials in the request for the data object in the backup data set match the security attributes for the data object as stored in the associated node of the metadata tree for the requested data object.

If the credentials match, then method 600 continues at operation 625, otherwise method 600 continues at operation 620

In operation 620, backup/restore service can optionally display a message such as "access denied" to a request for the data object and method 600 ends.

In operation 625, it can be determined whether the requested data object was deduplicated or compressed before being backed up and stored. If so, then in operation 630, the requested data object can be reconstructed (undeduplicated, decompressed, or both).

In operation 635, backup/restore service can optionally convert the data object into the client 110 file system format.

In operation 640, backup/restore service can return the requested object and associated metadata to the requesting client in the client file system format.

Figure 7:
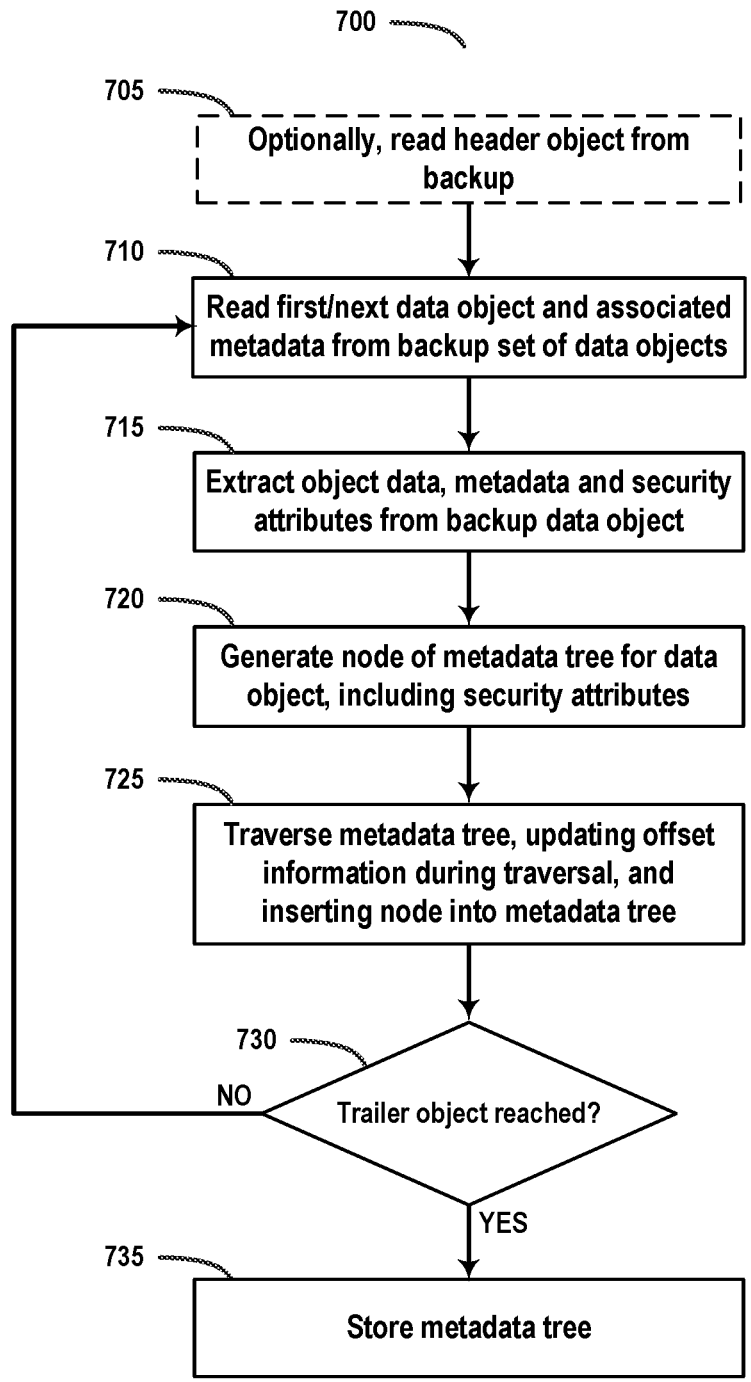
FIG. 7 illustrates a flow chart of a method of generating a metadata tree of backed up data from an extended snapshot of backup data, or from the backed up data, according to some embodiments.

FIG. 7 illustrates a flow chart of a method 700 that generates a metadata tree of backed up data from an extended snapshot of backup data, or from a backup that is in-progress or completed, according to some embodiments.

In operation 705, backup/restore service can optionally read the header object from the backup data set. The header object may be read, e.g., when the metadata tree is being constructed from the backup in-progress or completed, and reading the header object advances a read-pointer in the backup data set to the next data object in the backup data set.

In operation 710, backup/restore service can read the first (or next) data object from the backup data set, and the metadata associated with the data object. Metadata associated with the data object can include a filename associated with the data object, security attributes describing users, groups, or devices that are permitted to access the data object, and a size of the data object, the size including the associated metadata.

In operation 715, backup/restore service can extract the data object data from the data object as stored in the backup data set, and extract the data object metadata along with the security attributes.

In operation 720, backup/restore service can generate a node for insertion into the metadata tree, the node including the object data, the metadata, and the security attributes, and such link pointers as my be needed by generate the metadata tree structure.

In operation 725, backup/restore service can traverse the metadata tree and insert the node into the metadata tree. As the tree is traversed, backup/restore service can determine and update offset information in each node of the tree, such that, after inserting a node, an offset value is known as to where in the backup data set to perform a seek operation to obtain the requested data object.

In operation 730, it can be determined whether there the trailer object has been reached. If not, then method 700 continues at operation 710, otherwise method 700 continues at operation 735.

In operation 735, the metadata tree can be stored. In an embodiment, the trailer object metadata can be used to perform integrity checks on the metadata tree, such as determining whether the metadata tree contains as many nodes as the trailer object indicates there are data objects in the backup set, and whether the offset value of a node, generated during insertion of nodes into the tree, accurately points to the associated data object in the backup data set.

Figure 8:
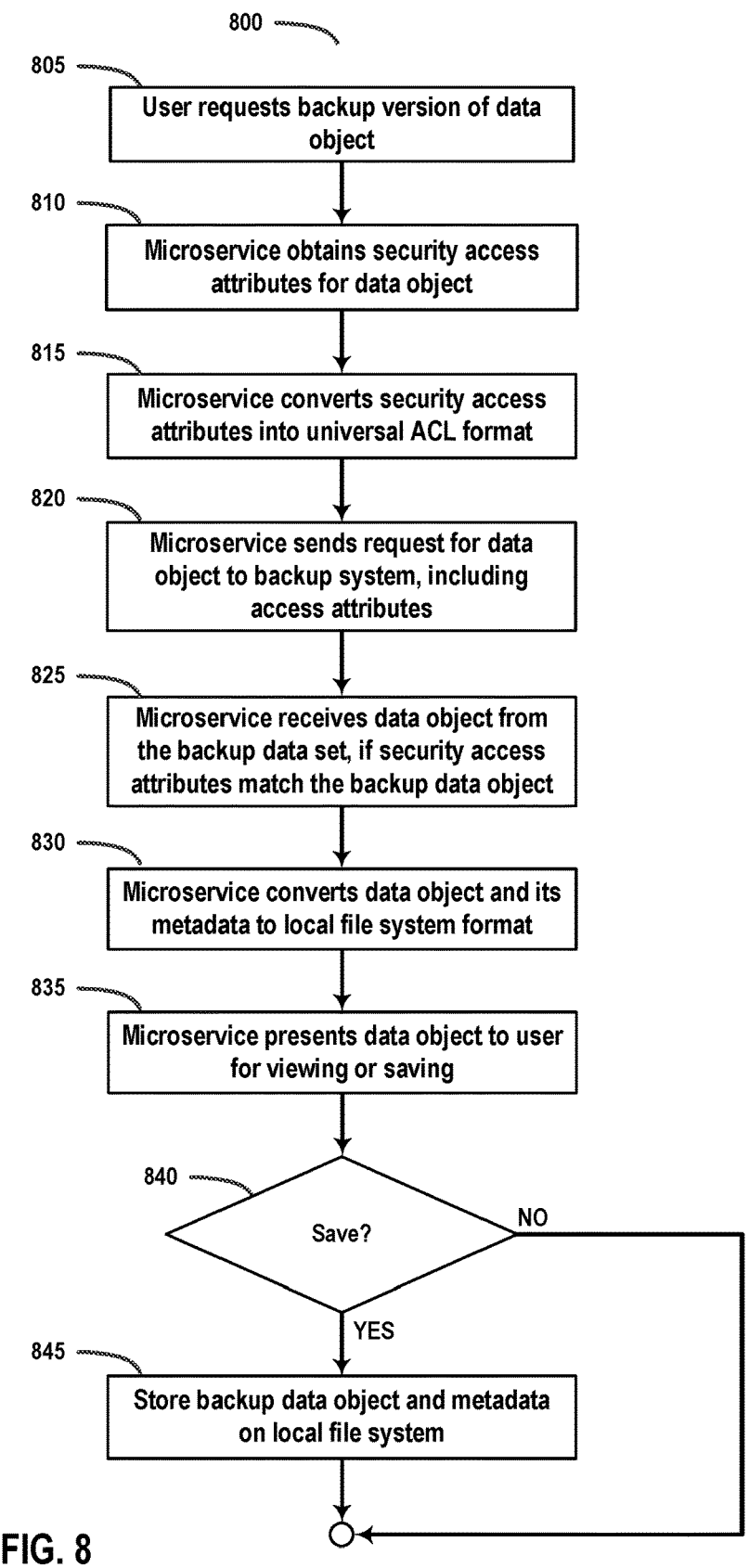
FIG. 8 illustrates a flow chart of a method of a client requesting restoration of a data object from a backup of a plurality of data objects of the client, according to some embodiments.

FIG. 8 illustrates a flow chart of a method 800 of a client 110 requesting a data object from a backup data set of a plurality of data objects, according to some embodiments.

In operation 805, a client 110 can generate a request to retrieve a data object from a backup data set of objects. Client 110 file user interface 112 can be used to receive the request from a user of client 110. Backup/restore API 114 can generate the request to the backup/restore service of the primary storage 120, backup server 140, or backup storage 160, depending on the particular place a system administrator chooses to implement the backup/restore service.

In operation 810, a micro service, such as the backup/restore service 114, can obtain the security access attributes for the requested data object.

In operation 815, the microservice 114 can convert the security access attributes into universal access control list (UACL) format, for inclusion in the request.

In operation 820, the microservice 114 can send the request for the data object to backup/restore service 124, 144, or 164, depending upon the place (primary storage 120, backup server 140, or backup storage 160) that the system administrator chooses to implement the backup/restore service.

In operation 825, the microservice 114 receives the data object from the backup/restore service 124, 144, or 164, if the security attributes retrieved by the client 110 backup/restore API 114 match the security attributes of the backup data object.

In operation 830, microservice 114, or backup/restore service 124, 144, or 164, converts the backup data object into the file system format of the requesting client 110.

In operation 835, microservice 114 uses file system user interface 112 to present the requested data object to the user in the client 110 file format.

In operation 840, it can be determined whether the file system user interface 112 has received as "save" command, to save the requested data object to primary storage 120. If so, then in operation 845, the requested data object is stored, along with metadata associated with the requested data object, in the primary storage 120 for access by the client 110.

Figure 9:
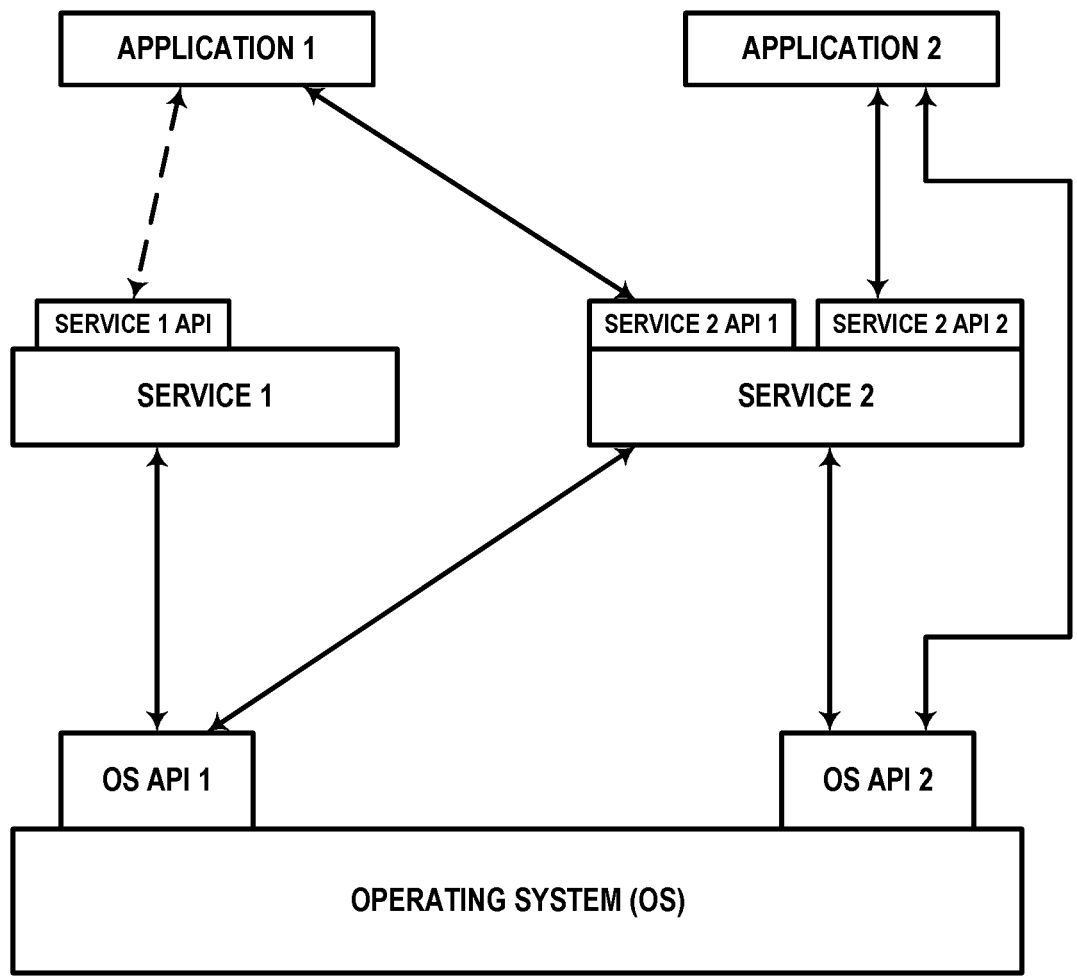
FIG. 9 illustrates an exemplary embodiment of a software stack usable in some embodiments of the invention.

In FIG. 9 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 10:
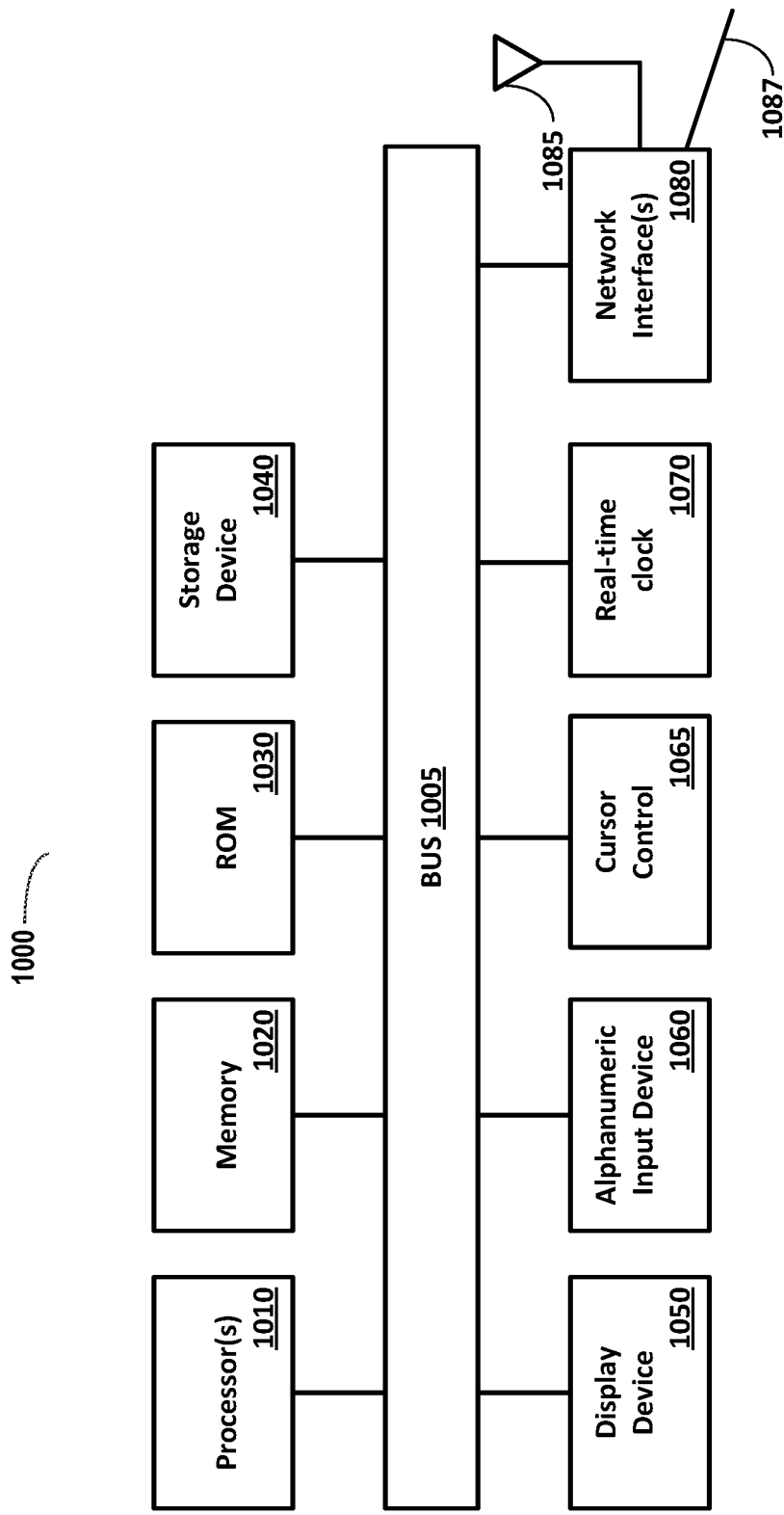
FIG. 10 illustrates, in block diagram form, an exemplary computing system for implementing concepts described herein.

FIG. 10 is a block diagram of one embodiment of a computing system 1000. The computing system illustrated in FIG. 10 is intended to represent a range of computing systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 10 may be used to provide a computing device and/or a server device.

Computing system 1000 includes bus 1005 or other communication device to communicate information, and processor 1010 coupled to bus 1005 that may process information.

While computing system 1000 is illustrated with a single processor, computing system 1000 may include multiple processors and/or co-processors 1010. Computing system 1000 further may include random access memory (RAM) or other dynamic storage device 1020 (referred to as main memory), coupled to bus 1005 and may store information and instructions that may be executed by processor(s) 1010. Main memory 1020 may also be used to store temporary variables or other intermediate information during execution of instructions by processor 1010.

Computing system 1000 may also include read only memory (ROM) 1030 and/or other static, non-transitory storage device 1040 coupled to bus 1005 that may store static information and instructions for processor(s) 1010. Data storage device 1040 may be coupled to bus 1005 to store information and instructions. Data storage device 1040 such as flash memory or a magnetic disk or optical disc and corresponding drive may be coupled to computing system 1000.

Computing system 1000 may also be coupled via bus 1005 to display device 1050, such as a light-emitting diode display (LED), or liquid crystal display (LCD), to display information to a user. Computing system 1000 can also include an alphanumeric input device 1060, including alphanumeric and other keys, which may be coupled to bus 1005 to communicate information and command selections to processor(s) 1010. Another type of user input device is cursor control 1065, such as a touchpad, a mouse, a trackball, or cursor direction keys to communicate direction information and command selections to processor(s) 1010 and to control cursor movement on display 1050. Computing system 1000 may further include a real-time clock 1070. The real-time clock 1070 may be used for generating date/time stamps for data records, computing elapsed time, and other time-keeping functions. A real-time clock 1070 can be a battery-backed chipset with a settable date and time. Alternatively, a real-time clock 1070 may include logic to retrieve a real-time from a network source such as a server or an Internet server via network interfaces 1080, described below.

Computing system 1000 further may include one or more network interface(s) 1080 to provide access to a network, such as a local area network. Network interface(s) 1080 may include, for example, a wireless network interface having antenna 1085, which may represent one or more antenna(e). Computing system 1000 can include multiple wireless network interfaces such as a combination of WiFi, Bluetooth® and cellular telephony interfaces. Network interface(s) 1080 may also include, for example, a wired network interface to communicate with remote devices via network cable 1087, which may be, for example, an Ethernet cable, a coaxial cable, a fiber optic cable, a serial cable, or a parallel cable.

In one embodiment, network interface(s) 1080 may provide access to a local area network, for example, by conforming to IEEE 802.11b, 802.11g, or 802.11n standards, and/or the wireless network interface may provide access to a personal area network, for example, by conforming to Bluetooth® standards. Other wireless network interfaces and/or protocols can also be supported. In addition to, or instead of, communication via wireless LAN standards, network interface(s) 1080 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method comprising:
receiving a request from a client device for retrieval of a data object from a backup set of data objects, the request including security attributes associated with the requested data object and client device, wherein the request further comprises an indication of a type of file system on the client device, and the data object is stored in a universal format independent of the file system on the client device;
in response to receiving the request, generating a metadata tree for the backup set of data objects in response to a determination that the metadata tree has not been generated; wherein generating the metadata tree comprises generating a node for insertion into the metadata tree, the node including the object data, a metadata associated with the object data, and the security attributes;
in response to determining that the security attributes in the request match one or more security attributes of the requested data object:
converting the data object and the associated metadata from the universal format to the file system format, then returning the requested data object and the metadata to the requesting client device.

2. The method of claim 1, wherein returning the requested data object and the metadata associated with the requested data object comprises:
traversing the metadata tree and finding a node in the metadata tree representing the requested data object;
determining, from the node, an offset in the backup data where the request data object is stored;
reading the data object from the backup set.

3. The method of claim 2, wherein the metadata associated with the data object is obtained from the node in the metadata tree associated with the requested data object.

4. The method of claim 1, wherein the security attributes of the data object are stored as metadata associated with the backup data object, the security attributes being stored in a universal format, and the method further comprises:
converting the security attributes in the request from a format known to the client device, into the universal format, before determining that the security attributes in the request match one or more security attributes of the requested data object.

5. The method of claim 1, further comprising reconstructing the data object from a deduplicated version of the requested data object before returning the requested data object and metadata associated with the data object to the requesting client device.

6. A non-transitory computer-readable medium programmed with executable instructions that, when executed by a processing system having at least one hardware processor, perform operations comprising:
   receiving a request from a client device for retrieval of a data object from a backup set of data objects, the request including security attributes associated with the requested data object and client device, wherein the request further comprises an indication of a type of file system on the client device, and the data object is stored in a universal format independent of the file system on the client device;
   in response to receiving the request, generating a metadata tree for the backup set of data objects in response to a determination that the metadata tree has not been generated; wherein generating the metadata tree comprises generating a node for insertion into the metadata tree, the node including the object data, a metadata associated with the object data, and the security attributes;
   in response to determining that the security attributes in the request match one or more security attributes of the requested data object:
   converting the data object and the associated metadata from the universal format to the file system format, then returning the requested data object and the metadata to the requesting client device.

7. The medium of claim 6, wherein returning the requested data object and metadata associated with the requested data object comprises:
   traversing the metadata tree and finding a node in the metadata tree representing the requested data object;
   determining, from the node, an offset in the backup data where the request data object is stored;
   reading the data object from the backup set.

8. The medium of claim 7, wherein the metadata associated with the data object is obtained from the node in the metadata tree associated with the requested data object.

9. The medium of claim 6, wherein the security attributes of the data object are stored as metadata associated with the backup data object, the security attributes being stored in a universal format, and the operations further comprise:
   converting the security attributes in the request from a format known to the client device, into the universal format, before determining that the security attributes in the request match one or more security attributes of the requested data object.

10. The medium of claim 6, further comprising reconstructing the data object from a deduplicated version of the requested data object before returning the requested data object and metadata associated with the data object to the requesting client device.

11. A system comprising:
   a processing system having at least one hardware processor, the processing system coupled to a memory programmed with executable instructions that, when executed by the processing system, perform operations comprising:
   receiving a request from a client device for retrieval of a data object from a backup set of data objects, the request including security attributes associated with the requested data object and client device, wherein the request further comprises an indication of a type of file system on the client device, and the data object is stored in a universal format independent of the file system on the client device;
   in response to receiving the request, generating a metadata tree for the backup set of data objects in response to a determination that the metadata tree has not been generated; wherein generating the metadata tree comprises generating a node for insertion into the metadata tree, the node including the object data, a metadata associated with the object data, and the security attributes;
   in response to determining that the security attributes in the request match one or more security attributes of the requested data object:
   converting the data object and the associated metadata from the universal format to the file system format, then returning the requested data object and the metadata to the requesting client device.

12. The system of claim 11, wherein returning the requested data object and metadata associated with the requested data object comprises:
   traversing the metadata tree and finding a node in the metadata tree representing the requested data object;
   determining, from the node, an offset in the backup data where the request data object is stored;
   reading the data object from the backup set.

13. The system of claim 12, wherein the metadata associated with the data object is obtained from the node in the metadata tree associated with the requested data object.

14. The system of claim 11, wherein the security attributes of the data object are stored as metadata associated with the backup data object, the security attributes being stored in a universal format, and the operations further comprise:
   converting the security attributes in the request from a format known to the client device, into the universal format, before determining that the security attributes in the request match one or more security attributes of the requested data object.

15. The system of claim 11, further comprising reconstructing the data object from a deduplicated version of the requested data object before returning the requested data object and metadata associated with the data object to the requesting client device.

* * * * *